Patented Apr. 13, 1954

2,675,409

UNITED STATES PATENT OFFICE 2,675,409

PREPARATION OF 2,4,6-TRICHLOROANILINE

Harold D. Orloff, Detroit, and John P. Napolitano, Ferndale, Mich., assignors to Ethyl Corporation, New York, N. Y., a corporation of Delaware No Drawing. Application January 4, 1952, Serial No. 265,052

5 Claims. (Cl. 260—579)

This invention relates to the preparation of certain organic compounds and more particularly to an improved method for the manufacture of 2,4,6-trichloroaniline.

Trichloroaniline is particularly important as a chemical intermediate in the manufacture of many benzene derivatives and other organic compounds. For instance, 2,4,6-trichloroaniline is an important precursor of 1,3,5-trichlorobenzene. The latter has been extensively studied and developed for use in the field of insecticides and fungicides. It in turn is a precursor of trichlorodinitrobenzene, which is especially important in combatting crop diseases and is an intermediate for dyestuffs.

These various intermediates and the final products prepared therefrom are presently exorbitantly high in cost. This is because of the great difficulty encountered in their manufacture. The important material, 2,4,6-trichloroaniline, has been nearly impossible to obtain, in the high degree of purity necessary for its further processing, by any method which is commercially practical, and yields are generally very low. The usual commercial method is to treat aniline with concentrated hydrohalide acid and then to chlorinate the resulting aniline hydrohalide, particularly the chloride, with the equivalent amount of chlorine, whereby the 2,4,6-trichloroaniline is produced. Without the acid treatment step, the chlorination of aniline gives the desired product in yields of 10 per cent or less. Following procedures satisfactory for the corresponding 2,4,6-tribromoaniline is not practical, for by such methods yields of less than about 60 per cent are realized. In addition, gross contamination of the product is often encountered, and the entire process obviously suffers from extreme disadvantages. The product is too impure to use for diazotization, for example, for coupling reactions to dyestuff intermediates without purification, e. g. recrystallization. This results in further loss in yield.

It is among the objects of this invention to overcome these and other disadvantages of prior art procedures. A particular object is to provide a relatively simple and inexpensive method for making 2,4,6-trichloroanilines of notably increased purity and in markedly higher yields than heretofore possible. A specific object is to synthesize high purity 2,4,6-trichloroaniline in yields substantially greater than 90 per cent of theory.

The above and other objects are realized by the present invention, which broadly comprises dissolving freshly distilled aniline in an anhydrous inert organic solvent system and passing anhydrous hydrogen halide through the system. Highly pure anhydrous aniline hydrohalide is thus obtained and is then further treated in the solvent system with a slight excess of anhydrous chlorine. This chlorination results in the desired 2,4,6-trichloroaniline in yields of at least 90 per cent and of purity generally so great that little or no further treatment is necessary to render it useful directly as an intermediate to prepare compounds like 1,3,5-trichlorobenzene.

According to a preferred embodiment, aniline is freshly distilled and the distillate dissolved in an anhydrous inert organic solvent system. Anhydrous hydrogen chloride is passed through the system, whereby aniline hydrochloride is formed. Anhydrous chlorine is then circulated through the system in an amount which is in excess of that stoichiometrically required for reaction with the constituents of the system. The product 2,4,6-trichloroaniline is recovered by any desired means from chlorination by-products and the solvent medium itself.

Although adaptation of this invention to chlorine compounds is preferred for practical reasons, as aforesaid, it is obvious that the new method is generally useful for making other halogen-substituted anilines, such as 2,4,6-tribromoaniline and 2,4,6-triiodoaniline. However, the advantage of this process is greatest when manufacturing the trichloroaniline, as the bromo- and iodo- compounds can be prepared in almost as good yields by prior art methods.

Essentially any organic solvent or solvent mixture can be chosen in which to carry out the reactions, which is substantially anhydrous and will not itself react with the other constituents of the system. It is, of course, important to achieve adequate solution of the aniline therein, as well as partial solution, or intimate suspension, of the aniline hydrohalide intermediate. To effect this, a solubilizing agent is frequently added which acts simultaneously as a chlorination accelerator. Such chlorination aids and solubilizing agents are well known in the art. They are generally lower aliphatic alcohols like methanol or ethanol, acetone and similar simple ketones, glacial acetic acid or diethyl ether and the like. Only a small proportion of these agents is usually necessary in a conventional organic solvent. For instance, about one to two volume per cent of ethanol based on the aniline is a satisfactory quantity in a solvent like carbon tetrachloride. The amount and type of such solubilizers and accelerators will naturally vary depending upon the particular solvent, and indeed its presence may not be important at all. Such materials appear to exert their benefit by increasing the reaction rate, more than by increasing the yield. As just indicated, carbon tetrachloride is an especially useful solvent. It is also obvious that the exact solvent selected is dependent in large measure on the hydrohalide under treatment. Frequently useful solvent systems, besides carbon tetrachloride, are chloroform, glacial acetic acid, dichloroethane, trichloroethane, tetrachloroethane, trichloroethylene, dichlorobenzene, trichlorobenzene and the like.

To realize the full value of the present invention, it is essential that the reaction system, both at the time of forming the aniline hydrohalide and at the time of final chlorination be substantially anhydrous and pure. Thus, if the aniline is not freshly distilled, and/or the solvent system and the halide and chlorine are not dry, the product will be discolored and of low purity and in general have the disadvantages so deplored in prior art methods. In addition, the yields will be most unfortunately low. The temperature at which the aniline hydrohalide salt is initially prepared is relatively unimportant. Room temperatures or preferably a little below, say 0° to 30° C., are perfectly satisfactory. The temperature for conducting the chlorination step is also quite unimportant, room temperatures or between about 0° C. and 40° C. being normally sufficient and most practical.

Another essential feature of the new process is the employment of an excess of chlorine to react with the aniline hydrohalide. The reason for the importance of this feature is not presently understood. One would certainly assume that only the amount of chlorine theoretically required for combination with the aniline salt would be sufficient, since the chlorine does not apparently serve any other purpose in the system than to react with the aniline compound. However, this is not the case. If merely this stoichiometric equivalent is used, undesirably low yields like the prior art are realized.

The importance of adding chlorine at more than stoichiometric equivalence, too, is not confined to the relation of the chlorine with the aniline hydrohalide. The total chlorine should be in excess of that required for the chlorination plus any side-reaction with other possibly reactive materials in the solvent system, e. g. solubilizing and chlorination accelerators. Generally speaking substantially between 105 per cent and 140 per cent of the quantity of chlorine stoichiometrically required to combine with all reactive constituents of the mass should be employed, and a range of from about 110 per cent to about 120 per cent of theory is frequently preferred.

As previously indicated, the obtainment of purified aniline hydrohalide is an essential preliminary to the chlorination step. This first reaction is achieved according to the present invention by dissolving freshly distilled aniline in a suitable organic solvent medium and treating the solution with anhydrous hydrogen halide, commonly in the form of a gas. There should generally be utilized about one mole of this halide per mole of aniline, i. e. stoichiometric equivalents of the two. Of course, an excess of the gas can be bubbled through the solution and have no effect on the reaction. Too, less than the molar equivalent of hydrogen halide can be employed, although the reaction will not be complete and may then be impractical from a cost standpoint. It is preferable to prepare the aniline hydrohalide in situ and then simply to treat the product, still in the same solvent system, with the chlorine to effect the second reaction step. It is, however, perfectly feasible to prepare the pure hydrohalide separately by the new procedure, and then to incorporate it in a separate solvent and carry out the chlorination in this manner.

The 2,4,6-trichloroaniline product of this invention can be recovered from the organic system by substantially any desired means. A particularly suitable method is to dilute the mass with water, separate the organic phase and treat this with an approximately equal volume of dilute acid. This acid treatment extracts various by-products, such as lower halogenated amines but essentially none of the trichloro product. The residual organic layer can then be washed with water and the solvent removed by simple evaporation, or preferably by drying at 60° C. under reduced pressure. The desired, highly pure 2,4,6-trichloroaniline product then remains. By recycling the acid from the initial step provides yields in excess of 92 per cent.

2,4,6-trichloroaniline is valuable as an intermediate in the preparation of trichloro benzenes for example. This subsequent reaction is effectuated by diazotizing the trichloroaniline in a suitable solvent such as ethanol, for instance by contacting the solution with sulfuric acid at room temperature, then adding sodium or a similar nitrite and warming the mass. Pouring the warmed (e. g. 45-50° C.) mixture into chilled water causes the desired 1,3,5-trihalobenzene to precipitate, and this can then be filtered out or otherwise recovered.

The following example is given by way of illustration and not in limitation of this invention. Indeed, as many apparently widely different embodiments of this invention can be made without departing from the spirit and scope hereof, it is to be understood that the invention is not limited to the specific embodiments hereof except as defined in the appended claims.

*Example*

Aniline was freshly distilled over zinc dust, and 400 parts of this material was dissolved in 4000 parts of dry carbon tetrachloride, which contained 80 parts of absolute ethyl alcohol. Anhydrous hydrogen chloride was introduced to this solution in the amount of 157 parts. A dense white crystalline suspension resulted, comprising very finely divided aniline hydrochloride in the solvent system. Dry chlorine gas was passed through this suspension to provide 1060 parts thereof. This proportion of chlorine was equal to 116 per cent of the theoretical amount necessary to react with the aniline hydrochloride, plus 1.36 molar excess to compensate for probable reaction with the ethanol, plus a 0.6 molar excess. This quantity of chlorine was added slowly to the system over a period of six hours, while good agitation was maintained. In both steps of this reaction, i. e. the hydrochloride formation and the chlorination, the reaction mixture was held at a temperature of about 16° C.

Following the chlorination step, the mass was diluted with six liters of water and agitated further. The organic layer was then separated out, treated with an aqual volume of 15 per cent (by volume) hydrochloric acid and washed with water. The washed organic phase was heated at 60° C. under reduced pressure of about 20 mm. of mercury, and the residual dry material recovered. This residue was analyzed and found to be 2,4,6-trichloroaniline. Calculated for $C_6H_4Cl_3N$, 54.2 per cent chlorine; found, 54.0 per cent. The yield of this product was 773 parts, corresponding to a yield of 92 per cent.

We claim:

1. A process for manufacturing 2,4,6-trichloroaniline which comprises dissolving freshly distilled aniline in an anhydrous inert organic solvent system, reacting the aniline substantially completely with anhydrous hydrogen halide, and reacting a stoichiometric excess of anhydrous chlorine with the so-produced aniline hydrohalide.

2. A process according to claim 1 wherein the inert organic solvent system is anhydrous carbon tetrachloride containing an organic chlorination accelerator.

3. A process for making 2,4,6-trichloroaniline which comprises dissolving freshly distilled aniline in anhydrous carbon tetrachloride containing a small proportion of a lower aliphatic alcohol, treating the solution with a substantially stoichiometric quantity of anhydrous hydrogen chloride, treating the resulting aniline hydrochloride suspension with anhydrous chlorine in an amount substantially between 105 per cent and 140 per cent of that stoichiometrically required for reaction with the constituents of said suspension, extracting chlorination by-products from the system, and removing the solvent from the residual 2,4,6-trichloroaniline product.

4. A process for making 2,4,6-trichloroaniline which comprises treating aniline hydrohalide in an anhydrous inert organic solvent system with a stoichiometric excess of anhydrous chlorine.

5. A process according to claim 3 wherein the lower aliphatic alcohol is ethanol.

References Cited in the file of this patent

UNITED STATES PATENTS

| Number | Name | Date |
|---|---|---|
| 1,303,624 | Ahlum | May 13, 1919 |

FOREIGN PATENTS

| Number | Country | Date |
|---|---|---|
| 334,217 | Great Britain | Aug. 29, 1930 |

OTHER REFERENCES

Erdelyi, "Chem. Abst." (1931), vol. 25, p. 2970.